(12) United States Patent
Cho

(10) Patent No.: US 7,867,643 B2
(45) Date of Patent: Jan. 11, 2011

(54) BATTERY MODULE INCLUDING A BATTERY MANAGEMENT SYSTEM CONTROLLING SECONDARY BATTERIES CONTAINING PROTECTIVE CIRCUITS

(75) Inventor: Kyu-Woong Cho, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 245 days.

(21) Appl. No.: 11/157,899

(22) Filed: Jun. 20, 2005

(65) Prior Publication Data

US 2005/0287400 A1 Dec. 29, 2005

(30) Foreign Application Priority Data

Jun. 25, 2004 (KR) ........................ 10-2004-0048159

(51) Int. Cl.
*H01M 2/00* (2006.01)
*H01M 2/02* (2006.01)
*H01M 14/00* (2006.01)
*H01M 2/24* (2006.01)

(52) U.S. Cl. .......................... 429/61; 429/179; 429/7; 429/158; 429/163

(58) Field of Classification Search ........... 429/96–100, 429/122, 162, 163, 61–62, 156–158, 149; 320/130, 104, 116, 120, 122, 137, 147; 180/54.1, 180/68.5
See application file for complete search history.

(56) References Cited

U.S. PATENT DOCUMENTS 4,247,603 A * 1/1981 Leffingwell et al. .......... 429/157
6,368,743 B1 * 4/2002 Guerin et al. ................ 429/159

(Continued)

FOREIGN PATENT DOCUMENTS

CN 1177217 A 3/1998

(Continued)

OTHER PUBLICATIONS

Machine Translation and Abstract in English of JP2000-277175.*

(Continued)

*Primary Examiner*—Dah-Wei D Yuan
*Assistant Examiner*—Claire L Rademaker
(74) *Attorney, Agent, or Firm*—Christie, Parker & Hale, LLP

(57) ABSTRACT

A battery module according to one embodiment of the present invention includes a plurality of unit batteries, each including a protective circuit for protecting the unit battery, and a battery management system electrically connected to the unit battery. Each unit battery further includes a molding part for covering the protective circuit, and a positive terminal and a negative terminal to be connected to each of the protective circuit, and which protrude outward from each molding part. A secondary battery according to another embodiment of the present invention includes an electrode group having a positive electrode, a negative electrode, and a separator interposed between the positive electrode and the negative electrode, a case for accommodating the electrode group, a cap assembly for sealing the case, a protective circuit electrically connected to the positive electrode and the negative electrode, a molding part for covering the protective circuit, and a positive terminal and a negative terminal electrically connected to the protective circuit.

16 Claims, 5 Drawing Sheets

U.S. PATENT DOCUMENTS

| | | | |
|---|---|---|---|
| 6,461,764 B1 * | 10/2002 | Nakamura | 429/170 |
| 6,953,632 B2 * | 10/2005 | Hayashi et al. | 429/26 |
| 2003/0152830 A1 * | 8/2003 | Eaves | 429/156 |
| 2004/0170887 A1 * | 9/2004 | Masumoto et al. | 429/61 |
| 2005/0089750 A1 * | 4/2005 | Ng et al. | 429/120 |
| 2005/0275372 A1 * | 12/2005 | Crowell | 320/112 |

FOREIGN PATENT DOCUMENTS

| | | | |
|---|---|---|---|
| CN | 1275249 A | | 11/2000 |
| CN | 2525687 Y | | 12/2002 |
| EP | 1 026 761 A1 | | 8/2000 |
| JP | 04-328279 | | 11/1992 |
| JP | 5-115129 | | 5/1993 |
| JP | 06-349480 | | 12/1994 |
| JP | 8-31460 | | 2/1996 |
| JP | 10-261440 | | 9/1998 |
| JP | 10-275612 | | 10/1998 |
| JP | 2000-077831 | | 3/2000 |
| JP | 2000-173668 | | 6/2000 |
| JP | 2000277175 A | * | 10/2000 |
| JP | 2002-100411 | | 4/2002 |
| JP | 2002-358941 | | 12/2002 |
| KR | 2003-0081637 | | 10/2003 |
| WO | WO 03015195 A1 | * | 2/2003 |

OTHER PUBLICATIONS

Patent Abstracts of Japan, Publication No. 10-261440; Publication Date: Sep. 29, 1998; in the name of Honbou et al.

Korean Patent Abstracts, Publication No. 1020030081637; Publication Date: Oct. 22, 2003; in the name of Park.

Japanese Office action dated Jun. 15, 2010, for corresponding Japanese Patent application 2005-173023, noting JP 2002-358941 and KR 2003-0081637, both previously filed in an IDS dated Mar. 12, 2009 and Mar. 7, 2006.

* cited by examiner

BATTERY MODULE INCLUDING A BATTERY MANAGEMENT SYSTEM CONTROLLING SECONDARY BATTERIES CONTAINING PROTECTIVE CIRCUITS

CROSS REFERENCE TO RELATED APPLICATION

The present application claims priority to and the benefit of Korean Patent Application No. 10-2004-0048159 filed on Jun. 25, 2004 in the Korean Intellectual Property Office, the entire content of which is incorporated herein by reference.

BACKGROUND OF THE INVENTION

1. Technical Field

The present invention relates to a secondary battery and a battery module, and more particularly, to a battery module constructed by electrically connecting a plurality of unit batteries and a secondary battery used as a unit battery in the battery module.

2. Related Art

Recently, high-output secondary batteries using non-aqueous electrolytes of a high energy density have been developed. High-capacity secondary batteries are constructed by connecting a plurality of high-power secondary batteries in series so that they can be used for driving motors of, for example, electric vehicles or hybrid electric vehicles, which require high electric power.

Such high-capacity secondary batteries ('battery modules') are composed of a plurality of secondary batteries ('unit batteries') which are generally connected in series.

Each of the unit batteries includes an electrode group having a positive electrode, a negative electrode, and a separator interposed therebetween, a case having a space for accommodating the electrode group, a cap assembly combined with the case to seal the case, and positive and negative terminals protruding upward from the cap assembly and electrically connected to the positive electrode and the negative electrode, respectively, which are provided in the electrode group.

When prismatic batteries are used as the unit batteries, generally the prismatic batteries are arranged in a battery module such that positive and negative terminals of one unit battery alternate between positive and negative terminals of another unit battery adjacent thereto. Also, the positive terminals and the negative terminals of the adjacent unit batteries are connected to each other via conductors to form a battery module.

One battery module includes several or up to tens of unit batteries. Thus, because of the heat generated from these unit batteries, the volume of the battery module increases due to inclusion of a cooling structure for radiating heat generated from the respective unit batteries, a safety means, and a system circuit.

Further, a battery module having multiple unit batteries is equipped with an additional battery management system ('BMS'), which limits an input or output current in order to prevent overcharge, over-discharge, over-current, excessive pressure, and overheating of the respective unit batteries.

However, in a conventional structure, the BMS has protective circuits for protecting the unit batteries during abnormal operation of the unit batteries together with circuits for controlling charging or discharging of the unit batteries so that a proper current can be applied to the unit batteries during charging or discharging thereof.

Therefore, the conventional BMS circuit structure can be complicated and difficult to design. In particular, in the case of battery modules that require high capacities for electric vehicles or hybrid electric vehicles, the number of unit batteries increases, necessitating simplification of the BMS.

SUMMARY OF THE INVENTION

In one exemplary embodiment of the present invention, there is provided a secondary battery and a battery module capable of simplifying the circuit structure of a BMS, enhancing stability, and simplifying structure.

In an exemplary embodiment of the present invention, the battery module includes a plurality of unit batteries, each having an electrode group with a positive electrode, a negative electrode, and a separator interposed between the positive electrode and the negative electrode, a case for accommodating the electrode group, and a cap assembly for sealing the case. Each unit battery further includes a protective circuit for protecting the unit battery. A battery management system is electrically connected to the unit batteries.

Each unit battery may further include a molding part for covering the protective circuit. In this case, a positive terminal and a negative terminal to be connected to the protective circuit may protrude from the molding part.

The battery management system may be located above the plurality of unit circuits. In one embodiment, an entire surface molding part is formed to cover the battery management system above the plurality of unit batteries.

Further, the battery management system is located above the plurality of protective circuits in one embodiment, and an entire surface molding part is formed to cover the plurality of protective circuits and the battery management system.

In another exemplary embodiment of the present invention, a secondary battery includes an electrode group having a positive electrode, a negative electrode, and a separator interposed between the positive electrode and the negative electrode, a case for accommodating the electrode group, a cap assembly for sealing the case, a protective circuit electrically connected to the positive electrode and the negative electrode, and a positive terminal and a negative terminal electrically connected to the protective circuit.

The secondary battery may further include a molding part for covering the protective circuit. The molding part may be made of a resin curable material, for example, an epoxy resin. The molding part and the protective circuit may be located above the cap plate. In some embodiments, the second battery may be used for an electric vehicle or a hybrid electric vehicle.

BRIEF DESCRIPTION OF THE DRAWINGS

The above and other features of the present invention will become more apparent by describing exemplary embodiments thereof in detail with reference to the accompanying drawings in which.

DESCRIPTION OF THE EMBODIMENTS

The present invention will be described more fully hereinafter with reference to the accompanying drawings, in which exemplary embodiment of the invention are shown.

Figure 1:
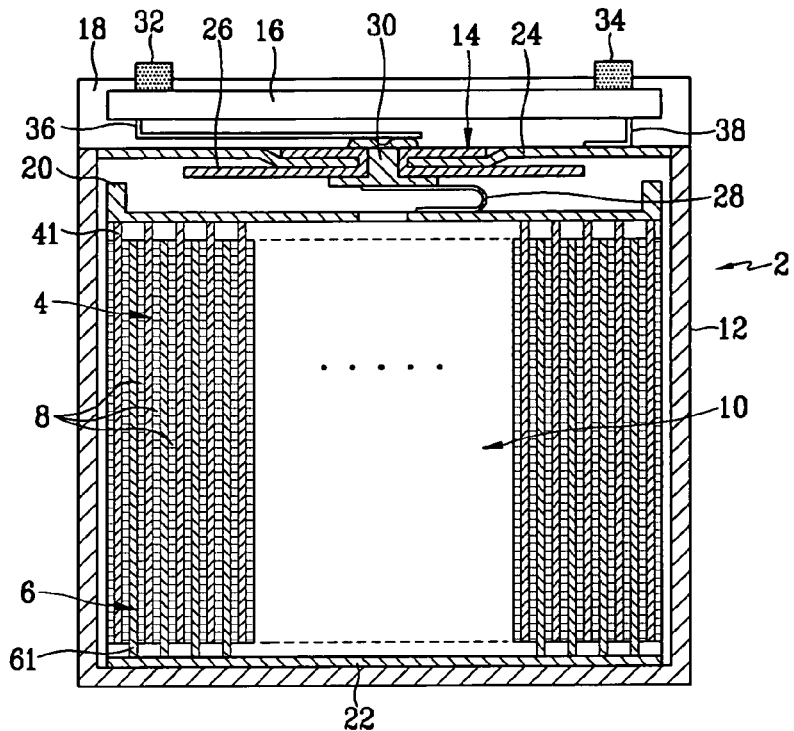
FIG. 1 is a cross-sectional view of a secondary battery according to an embodiment of the present invention.

Referring to FIG. 1, a unit battery 2 includes an electrode group 10 having a positive electrode 4, a negative electrode 6, and a separator 8 interposed therebetween, a case 12 having its one end opened so as to accommodate the electrode group 10 along with an electrolyte, a cap assembly 14 provided at an upper end of the opening of the case 12 for sealing the case 12, a protective circuit 16 provided above the cap assembly 14 for protecting the battery, and a molding part 18 which covers the protective circuit 16.

The molding part 18 is attached to the outside of the cap assembly 14 while covering the protective circuit 16, and integrally connects the unit battery 2 with the protective circuit 16. That is, the molding part 18 combines the unit battery 2 and the protective circuit 16 into one unit.

The molding part 18 is obtained by curing a liquid resin. Specifically, the molding part 18 can be formed above the cap assembly 14 by coating a liquid resin on the cap assembly 14 provided with the protective circuit 16 to cure the coated liquid resin with the protective circuit 16. Any suitable resin material may be used as the resin for forming the molding part 18, as long as it is cured at normal temperature and does not affect the performance of the battery. In some embodiments, an epoxy resin or a thermoplastic resin may be used.

An electrode group 10 is wound in the shape of a jellyroll and is located in a prismatic case 12. An uncoated region 41 of the positive electrode 4 and an uncoated region 61 of the negative electrode 6, which are respectively connected to a positive collector plate 20 and a negative collector plate 22, are formed along one end of each of the positive and negative electrodes 4 and 6. However, the present invention is not limited to the above structure.

The electrode group 10 is an electrode group of a jellyroll type, in which the positive electrode 4 and the negative electrode 6, each including a coated region having its active material coated on the collector plate, are spirally wound while they are stacked with the separator 8 interposed therebetween. The uncoated region 41 of the positive electrode 4 and the uncoated region 61 of the negative electrode 6 are disposed opposite to each other at both ends of the electrode group 10, respectively.

Assuming from the above structure that the case 12 is vertically erected so as to locate the cap assembly 14 above the case 12, the uncoated region 41 of the positive electrode 4 is welded to the positive collector plate 20 while it faces upward, and the uncoated region 61 of the negative electrode 6 is welded to the negative collector plate 22 while it faces downward.

The cap assembly 14 includes a negative plate 24, which contacts the case 12, and a middle terminal 30, which is insulated from the negative plate 24 by a gasket 26 and connected to a positive lead 28. The middle terminal 30 is electrically connected to the positive collector plate 20 via the positive lead 28, and the negative plate 24 is electrically connected to the negative collector plate 22 by the case 12.

The protective circuit 16 is located above the cap assembly 14, and has a positive terminal 32 and a negative terminal 34 on the outside thereof. The protective circuit 16 has its positive terminal electrically connected to the middle terminal 30 via a first lead 36, and its negative terminal electrically connected to the negative plate 24 via a second lead 38. Further, the protective circuit 16 interrupts an electrical connection of the unit battery 2 by a circuit control method to protect the unit battery 2 at the time of abnormal operation of the unit battery 2.

Figure 2:
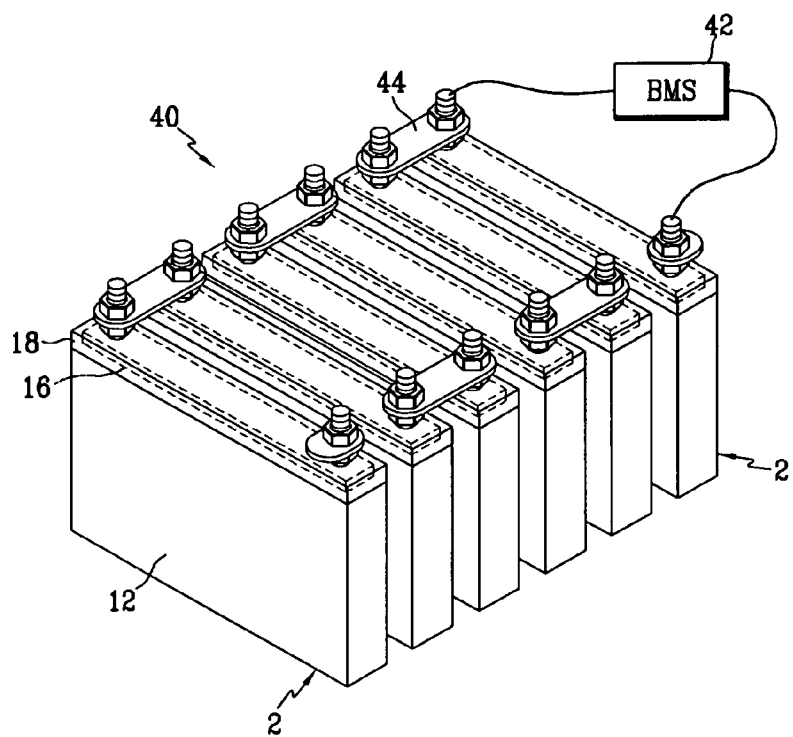
FIG. 2 is a perspective view of a battery module according to a first embodiment of the present invention.

FIG. 2 shows a battery module 40 that is constructed by arranging a plurality of unit batteries 2 having the above structure. The battery module 40 includes a plurality of unit batteries 2, and a BMS 42 electrically connected to the unit batteries 2. In each of the unit batteries 2, the protective circuit 16 is provided on one side of the case 12, and the molding part 18 is formed on the protective circuit 16.

The respective unit batteries 2 are arranged at regular intervals in a housing (not shown) which forms the outer shape of the battery module 40, and are electrically connected to connecting members 44. These unit batteries 2 are electrically connected to the BMS 42, and their operation is controlled by the BMS 42.

The BMS 42 has a circuit structure which limits input and/or output currents in order to prevent overcharge, overdischarge, over-current, excessive pressure, and overheating of the battery module 40. In this embodiment, it is possible to exclude a circuit structure for protection of the individual unit batteries 2 in designing the circuit of the BMS 42 because each of the unit batteries 2 constituting the battery module 40 has its own protective circuit 16.

That is, since the protective circuits 16 are separately provided in the respective unit batteries 2 while being covered with the molding parts 18, it is possible to exclude the structure of the protective circuit 16 from the BMS 42. As a result, the circuit structure of the BMS 42 can be simplified.

Figure 3:
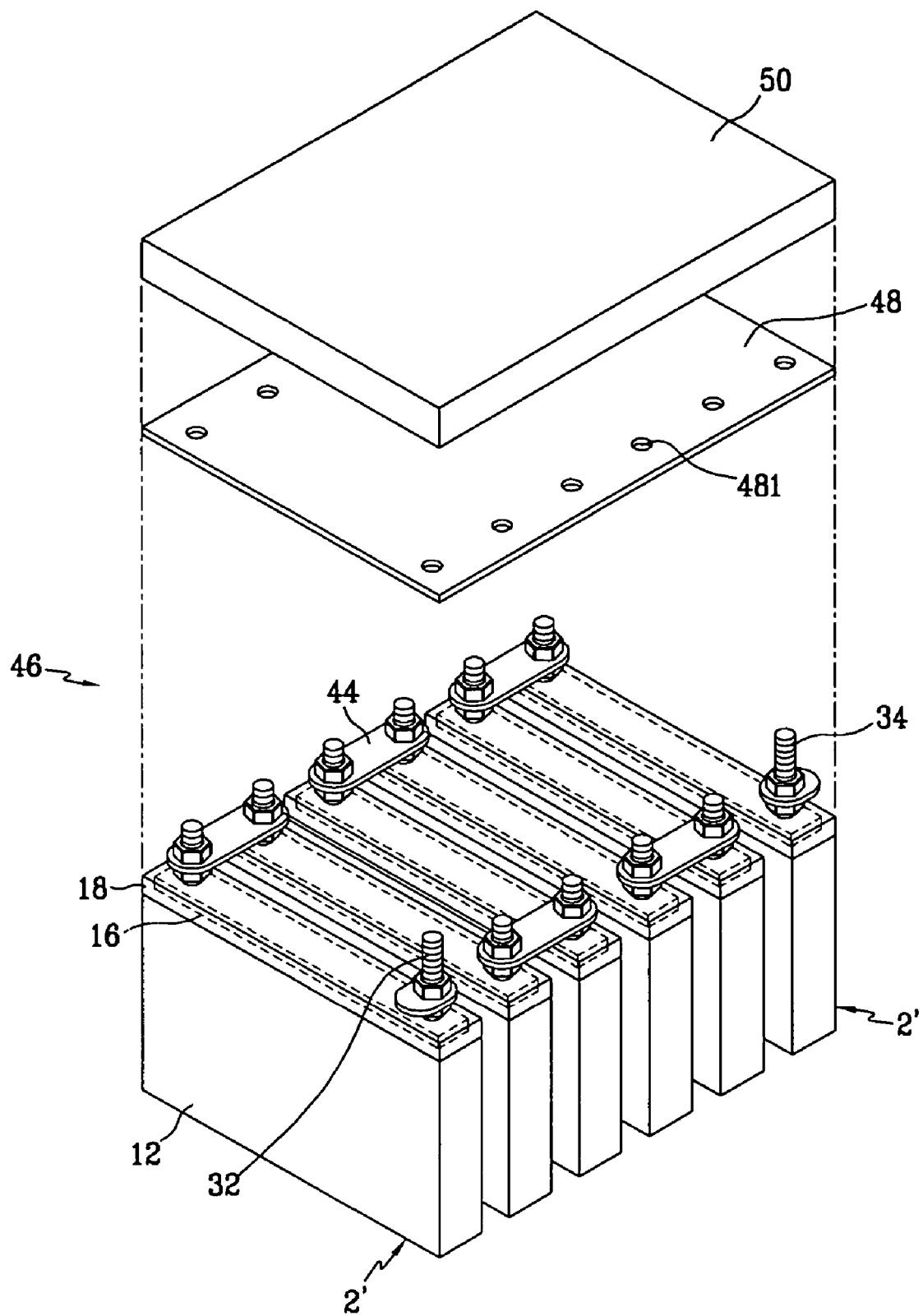
FIG. 3 is a side view of a battery module according to a second embodiment of the present invention.
Figure 4:
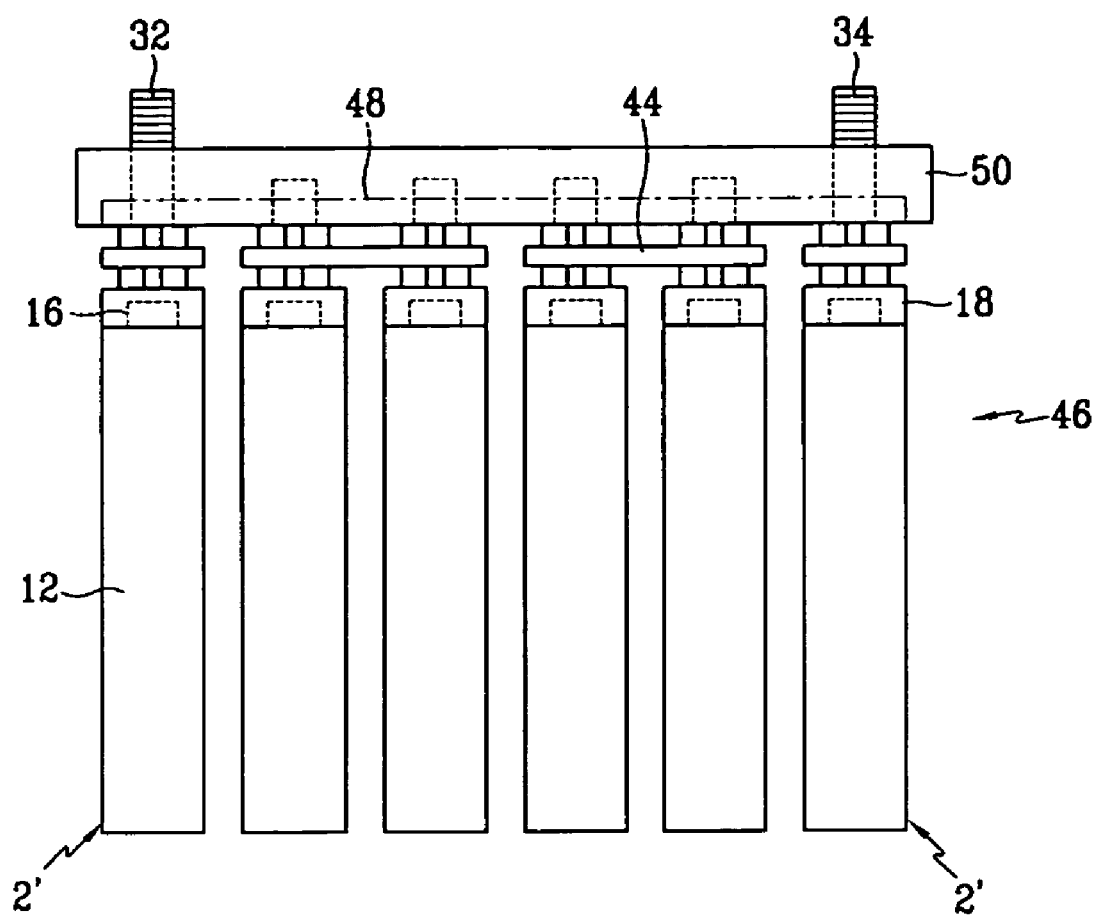
FIG. 4 is a perspective view of the battery module according to the second embodiment of the present invention.

As shown in FIGS. 3 and 4, the BMS can be integrated with the unit batteries with resin molding. A battery module 46 according to a second embodiment of the present invention includes a plurality of unit batteries 2', a BMS 48 combined with upper portions of the unit batteries 2', and an entire surface molding part 50 formed to cover the BMS 48 above the unit batteries 2'. In each of the unit batteries 2', the protective circuit 16 is provided for protecting each of the unit batteries 2', and the molding part 18 is formed on the protective circuit 16. The BMS 48 and the unit batteries 2' are electrically connected to each other.

The BMS 48 has a plate shape, and has a plurality of fitting holes 481 into which positive electrodes 32 and negative electrodes 34 are fitted, respectively. This allows the BMS 48 to combine with the plurality of unit batteries 2' arranged at regular intervals above these unit batteries 2'.

The entire surface molding part 50 is formed by curing a liquid resin after coating it on the BMS 48. The entire surface molding part 50 is made of the same material as the molding part 18 provided on each of the unit batteries 2'. This allows the plurality of unit batteries 2', the BMS 48 and the entire surface molding part 50 to be combined as one body to form the battery module 46.

As such, in the respective unit batteries 2', the molding parts 18 are separately provided to protect the respective protective circuits 16, and the entire surface molding part 50 fixes the BMS 48 to the upper portions of the plurality of unit batteries 2'. Accordingly, the battery module 46 has the BMS 48 built therein and the plurality of unit batteries 2' and the BMS 48 packaged as one body, so that the structure of the battery module can be simplified.

Figure 5:
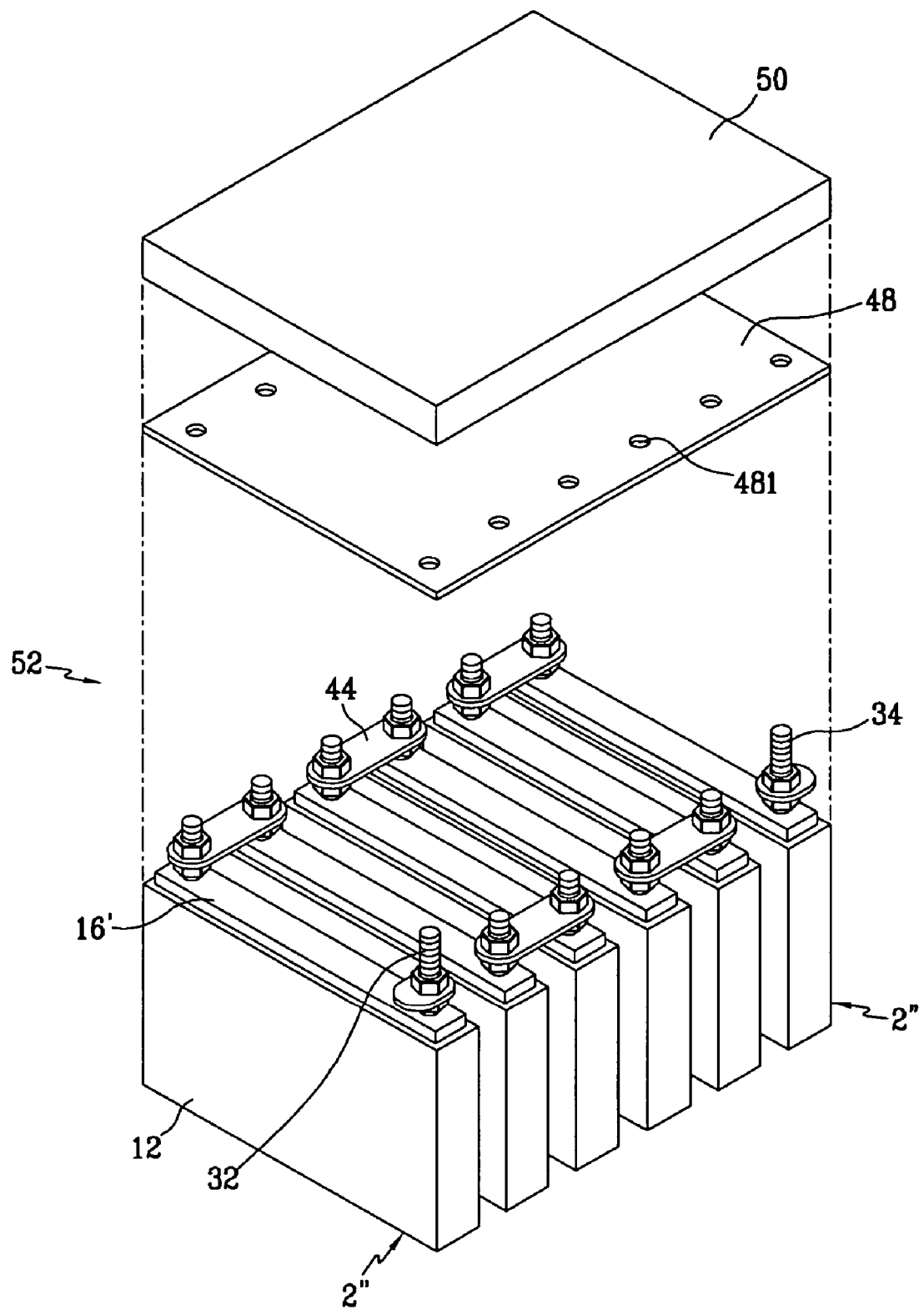
FIG. 5 is a perspective view of a battery module according to a third embodiment of the present invention.
Figure 6:
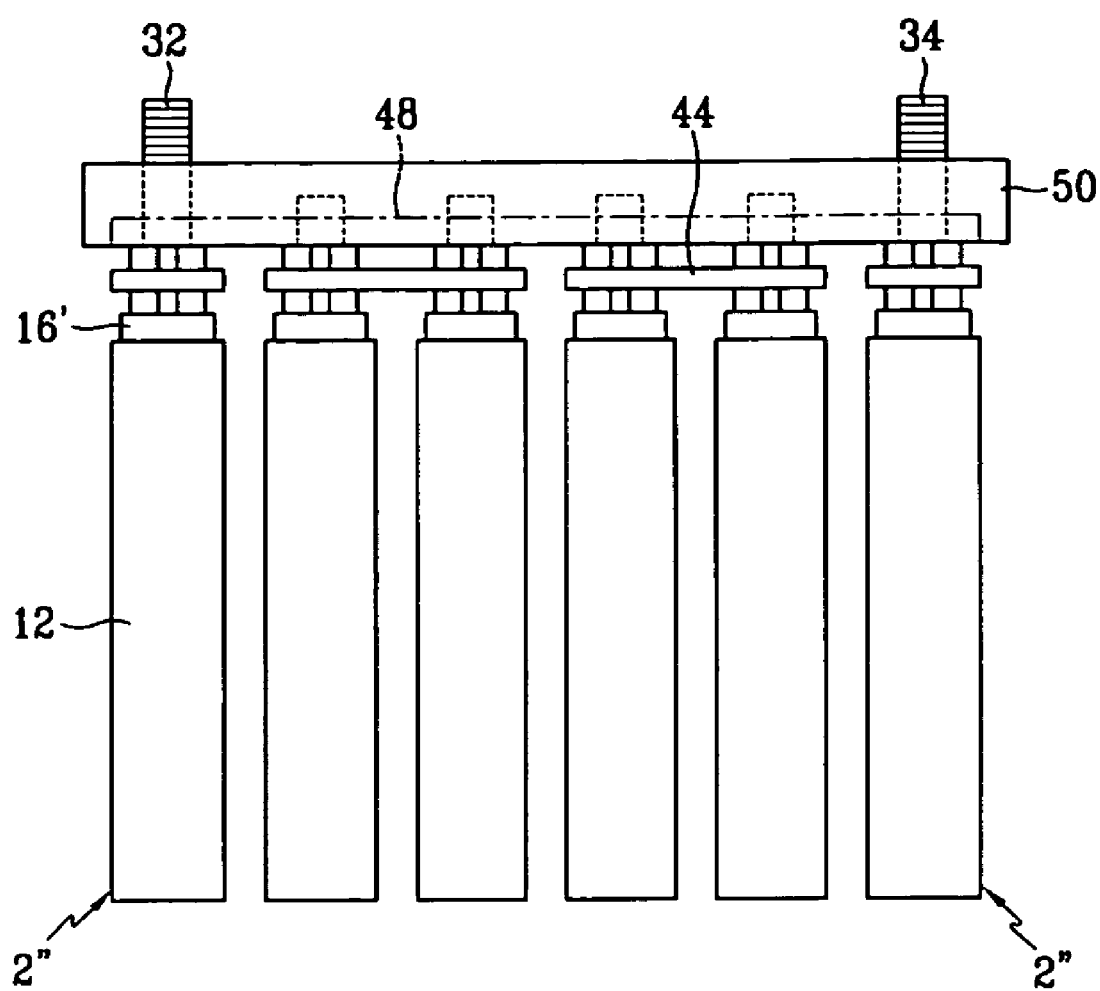
FIG. 6 is a perspective view of the battery module according to the third embodiment of the present invention.

Referring to FIGS. 5 and 6, a battery module 52 according to a third embodiment of the present invention includes a plurality of unit batteries 2" each having a protective circuit 16', a BMS 48 located above the protective circuits 16' of the unit batteries 2" and electrically connected to the unit batteries 2", and an entire surface molding part 50 formed above the unit batteries 2" to cover the protective circuits 16' of the unit batteries 2" and the BMS 48.

In the third embodiment, the plurality of unit batteries 2" and the BMS 48 can be packaged as one body by the entire surface molding part 50 without providing each of the unit batteries 2" with separate molding parts.

The battery modules 40, 46 and 52 in the exemplary embodiments of the present invention as described above can be effectively used as batteries for electric vehicles or hybrid electric vehicles which require high-output and high-capacity characteristics.

As described above, the circuit structure of the BMS can be simplified because the BMS does not need to be provided with a circuit structure for protection of individual unit batteries. Further, the respective unit batteries constituting the battery module can be packaged as one body to simplify and standardize the battery module. Moreover, since the protective circuit is provided in each of the unit batteries, and can be covered with a molding part, the stability of the unit battery can be enhanced.

Although certain exemplary embodiments of the present invention have been described in detail hereinabove, it should be clearly understood that many variations and/or modifications of the basic inventive concept herein taught which may appear to those skilled in the art are within the spirit and scope of the present invention, as defined in the appended claims and equivalents thereof.

What is claimed is:

1. A battery module comprising:
   a plurality of unit batteries, each unit battery of the plurality of unit batteries including an electrode group comprising a first electrode, a second electrode, and a separator between the first electrode and the second electrode, a case for accommodating the electrode group, and a cap assembly for sealing the case, the cap assembly comprising a plate contacting the case and a middle terminal insulated from the plate by a gasket;
   a separate protective circuit for each unit battery of the plurality of unit batteries for protecting the unit battery by interrupting an electrical connection of the unit battery; and
   a battery management system electrically connected to the unit batteries; wherein for each of the unit batteries, the protective circuit is located proximate the cap assembly and has a first terminal electrically connected to the middle terminal and a second terminal electrically connected to the plate.

2. The battery module of claim 1, wherein each unit battery further comprises a molding for covering the protective circuit.

3. The battery module of claim 2, wherein the positive first terminal and the second terminal protrude from the molding.

4. The battery module of claim 2, wherein the battery management system is located adjacent the plurality of unit batteries.

5. The battery module of claim 4, further comprising a cover molding for covering the battery management system.

6. The battery module of claim 1, further comprising a cover molding for covering each separate protective circuit and the battery management system.

7. The battery module of claim 1, wherein the cap assembly of each unit battery of the plurality of unit batteries is between the separate protective circuit and the electrode group of each unit battery of the plurality of unit batteries.

8. The battery module of claim 1, wherein the plurality of unit batteries are secondary batteries for powering an electric vehicle.

9. The battery module of claim 1, wherein the plurality of unit batteries are secondary batteries for powering a hybrid electric vehicle.

10. The battery module of claim 2, wherein the cap assembly of each unit battery of the plurality of unit batteries is between the electrode group and each molding covering each separate protective circuit of each unit battery of the plurality of unit batteries.

11. The battery module of claim 2, wherein the molding comprises resin curable material.

12. The battery module of claim 2, wherein the molding comprises an epoxy resin.

13. The battery module of claim 1, wherein each of the plurality of unit batteries is connected to an adjacent unit battery by a connecting member.

14. The battery module of claim 1, wherein the battery management system contacts only one of the plurality of unit batteries.

15. A battery module comprising:
    a plurality of unit batteries, each including an electrode group having a positive electrode, a negative electrode, and a separator interposed between the positive electrode and the negative electrode; a case for accommodating the electrode group; and a cap assembly for sealing the case including a negative plate contacting the case and a middle terminal insulated from the negative plate by a gasket;
    a protective circuit provided in each unit battery for protecting the unit battery; and
    a battery management system electrically connected to the plurality of unit batteries;
    wherein, for each of the unit batteries, the protective circuit is located proximate the cap assembly and has a positive terminal electrically connected to the middle terminal and a negative terminal electrically connected to the negative plate; and
    wherein the protective circuit is covered by a molding part such that the unit battery and the protective circuit are combined as a single unit.

16. The battery module of claim 1, wherein the battery mangement system has a plurality of fitting holes, wherein the first terminal and the second terminal are coupled to respective ones of the fitting holes to electrically connect the battery management system to the plurality of unit batteries.

\* \* \* \* \*

UNITED STATES PATENT AND TRADEMARK OFFICE
CERTIFICATE OF CORRECTION

| | | |
|---|---|---|
| PATENT NO. | : 7,867,643 B2 | Page 1 of 1 |
| APPLICATION NO. | : 11/157899 | |
| DATED | : January 11, 2011 | |
| INVENTOR(S) | : Kyu-Woong Cho | |

It is certified that error appears in the above-identified patent and that said Letters Patent is hereby corrected as shown below:

Column 5, Claim 3, line 53          Delete "positive"

Column 6, Claim 16, line 53         Delete "mangement"
                                                                        Insert -- management --

Signed and Sealed this
Twenty-eighth Day of February, 2012

David J. Kappos
*Director of the United States Patent and Trademark Office*